(12) United States Patent
Maloney et al.

(10) Patent No.: US 11,435,991 B2
(45) Date of Patent: Sep. 6, 2022

(54) AUTOMATED MACHINE DEPLOYMENT AND CONFIGURATION

(71) Applicant: aiden technologies, Inc., Plano, TX (US)

(72) Inventors: Sean Eren Maloney, Shasta Lake, CA (US); Jeffrey David Moore, Croton on Hudson, NY (US); Joshua E Aaron, Plano, TX (US)

(73) Assignee: Aiden Technologies, Inc., Plano, TX (US)

( * ) Notice: Subject to any disclaimer, the term of this patent is extended or adjusted under 35 U.S.C. 154(b) by 0 days.

(21) Appl. No.: 16/931,441

(22) Filed: Jul. 16, 2020

(65) Prior Publication Data
US 2022/0019446 A1    Jan. 20, 2022

(51) Int. Cl.
*G06F 8/61*       (2018.01)
*G06F 40/30*    (2020.01)
*G06F 9/445*    (2018.01)
*G06F 8/65*       (2018.01)

(52) U.S. Cl.
CPC ............... *G06F 8/61* (2013.01); *G06F 8/65* (2013.01); *G06F 9/44505* (2013.01); *G06F 40/30* (2020.01)

(58) Field of Classification Search
CPC .. G06F 8/60–71; G06F 9/44505; G06F 40/20; G06F 40/30
USPC ................................................. 717/168–178
See application file for complete search history.

(56) References Cited

U.S. PATENT DOCUMENTS

| | | | | |
|---|---|---|---|---|
| 6,066,182 A * | 5/2000 | Wilde | ........................ | G06F 8/61 717/175 |
| 8,336,080 B2 * | 12/2012 | Herrod | ................ | H04L 41/0813 726/1 |
| 8,495,183 B2 * | 7/2013 | Tukol | .................. | G06F 9/44505 709/220 |
| 10,083,024 B2 * | 9/2018 | Gopalakrishnan | ...... | H04L 67/34 |
| 10,437,577 B2 * | 10/2019 | Balar | ..................... | H04W 12/00 |
| 10,545,849 B2 * | 1/2020 | Salameh | ................. | G06F 11/00 |
| 10,909,128 B2 * | 2/2021 | Beringer | ............... | G06F 16/248 |
| 2007/0239801 A1 * | 10/2007 | Lee | ..................... | G11B 20/1254 |
| 2010/0333166 A1 * | 12/2010 | Herrod | ................ | H04L 41/0843 726/1 |

(Continued)

FOREIGN PATENT DOCUMENTS

WO       WO 2005/031570        4/2005

OTHER PUBLICATIONS

Natural-language processing, Wikipedia, 2018, 9 pages, [retrieved on Apr. 23, 2022], Retrieved from the Internet: <URL:https://web.archive.org/web/20180314180005/https://en.wikipedia.org/wiki/Natural_language_processing>.*

(Continued)

*Primary Examiner* — Geoffrey R St Leger
(74) *Attorney, Agent, or Firm* — IP Spring

(57) ABSTRACT

Implementations described herein relate to methods, systems, and computer-readable media for automated computer configuration. In some implementations, a method includes providing a configuration tool on a computer. The method further includes accessing a configuration file that includes configuration settings, wherein the configuration file is a plain text file. The method further includes selecting particular settings for the computer from the configuration settings based at least in part on the configuration file and identification information of the computer. The method further includes automatically configuring the computer with particular software that is identified based on the particular settings.

19 Claims, 6 Drawing Sheets

(56) References Cited

U.S. PATENT DOCUMENTS

| | | | |
|---|---|---|---|
| 2013/0085882 A1* | 4/2013 | Gounares | G06F 9/44505 |
| | | | 705/26.1 |
| 2016/0259780 A1 | 9/2016 | Panemangalore et al. | |
| 2017/0131993 A1* | 5/2017 | Salameh | G06F 8/71 |
| 2017/0153882 A1* | 6/2017 | Gopalakrishnan | H04L 67/34 |
| 2018/0088932 A1 | 3/2018 | Ouarraoui et al. | |
| 2018/0173868 A1* | 6/2018 | Bowman | G06F 21/45 |
| 2019/0243627 A1* | 8/2019 | Balar | G06F 21/45 |
| 2019/0294718 A1* | 9/2019 | Beringer | G06F 16/2465 |

OTHER PUBLICATIONS

Regular expression, Wikipedia, 2018, 24 pages, [retrieved on Apr. 23, 2022], Retrieved from the Internet: <URL: https://web.archive.org/web/20180411132855/https://en.wikipedia.org/wiki/Regular_expression>.*

Massdeploy, "Let Us Package Your Software", https://www.massdeploy.com/application-packages/, Jan. 20, 2020, 32 pages.

Massdeploy, "And We'll Provide a Managed Software Portal", https://www.massdeploy.com/software-portal/, Jan. 1, 2020, 2 pages.

Massdeploy, "We'll Replace Your Images With Automated Builds", https://www.massdeploy.com/os-builds/, Jan. 1, 2020, 11 pages.

"International Search Report and Written Opinion in International Application No. PCT/US2021/041496", dated Oct. 27, 2021, 14 pages.

Anonymous, "Plain Text—Wikipedia", URL:http://web.archive.org/web/20200502070344/https:// en.wikipedia.org/wiki/Plain_text, May 2, 2020, pp. 1-5 [retrieved from the Internet on Oct. 14, 2021].

\* cited by examiner

```
Microsoft Driver Pack - Surface Pro 6* =              Model = Surface Pro 6                                              310
Microsoft Driver Pack - Surface Series* =             Model = Surface (Book|Pro 3|Pro 2|.*Pro|3)
Microsoft Driver Pack - Surface Studio 2* =           Model = Surface Studio 2
Microsoft Hyper-V Integration Services 6.3.9600.16384* = Microsoft_VM & Win_8.0 | Win_2012 | Win_7
| Win_2008R2 | Win_Vista | Win_2008 | Win_XP | Win_2003 & Config_Set | Self-Serve
Nutanix VirtIO 1.1.4.38 =                             Manufacturer = Nutanix & Model = AHV
Parallels Tools 15.1.1.47117 =                        Parallels_VM & Config_Set | Self-Serve
VMware Tools 10.3.10.12406962 =                       VMware_VM & Config_Set | Self-Serve
```

```
; /--- Standard Builds /---                                                                                              320
7-Zip 19.00 =                                         Always
Adobe Acrobat Reader DC MUI 20.009.20067 =            Workstation_OS
Adobe Flash Player (Remove) =                         Mandatory & Installed = Adobe Flash Player.*:*
Microsoft Edge 83.0.478.45 =                          Always
Microsoft Office 365 ProPlus 1908 16.0.11929.20648 =  Workstation_OS & Config_Set | Generic
; MassDeploy Outlook Signature =                      Workstation_OS & Config_Set | Generic
Microsoft OneDrive 20.084.0426.0007 =                 Workstation_OS
Microsoft PowerShell 7.0.2.0 =                        Always
Microsoft PowerToys (Preview) 0.15.2 =                Workstation_OS
Microsoft Teams Machine-Wide Installer 1.2.0.13765 =  Workstation_OS & Config_Set | Generic
Microsoft Windows Internet Explorer 11 =              Win_7 | Win_2008R2
Oracle Java 8 (Remove) =                              Installed = Java 8.*:* & Silent | Unattended |
Interactive
Raleway Fonts 3.000 =                                 Workstation_OS
```

```
; ---/ IT Builds /---                                                                                                    330
FileZilla Client 3.37.4 =                                              Config_Set = IT | Optional &
Workstation_OS
Inkscape 0.92.4.0 =                                                    Config_Set = IT | Optional &
Workstation_OS
KeePass 2.42.1 =                                                       Config_Set = IT | Optional &
Workstation_OS
Krita 4.2.9.0 =                                                        Config_Set = IT | Optional &
Workstation_OS
Microsoft Orca 8.59.25584 =                                            Config_Set = IT | Optional &
Workstation_OS
*Microsoft Remote Server Administration Tools for Windows 7 =          Config_Set = IT & WIN_7
*Microsoft Remote Server Administration Tools for Windows 10 10.0.14393.347 =   Config_Set = IT & OS_Ver
>= 10 & OS_Ver < 10.0.17763
Microsoft Remote Server Administration Tools for Windows 10 1809 =     Config_Set = IT & OS_Ver >=
10.0.17763 & OS_Ver < 10.0.17764
Microsoft Remote Server Administration Tools for Windows 10 1903-1909 = Config_Set = IT & OS_Ver >=
10.0.18362 & OS_Ver < 10.0.18364
Microsoft Windows Assessment and Deployment Kit - Windows 10 10.1.18362.1 =   Config_Set = IT & Win_10
Notepad++ 7.6.3 =                                                      Config_Set = IT | Optional
Pantaray SuperOrca 11.0.0.1 =                                          Config_Set = IT | Optional &
Workstation_OS
Zoom 5.0.26213 =                                                       Config_Set = IT | Optional &
Workstation_OS
Zoom Outlook Plugin 5.0.23115 =                                        Config_Set = IT | Optional &
Workstation_OS
```

FIG. 3

```
IT =                Target-Config = IT
; Standard apps, plus IT apps, and IT configurations Lab =               Target-Config = (Lab|Test) | Image-Name =
.*(Lab|Test) Build
; Common apps and configurations for demos and testing Generic =           Target-Config = Generic
; Minimal apps without company-specific configurations Standard =          Default
; Company-standard applications and configurations
```
— 410

```
itunes is interactive or unattended and optional except for Marketing
```
— 415

FIG. 4A

```
enum Verbosity
{
        interactive
        unattended
        silent
}
```
— 420

FIG. 4B

```
// Applicability is an enumeration (an ordered list of values), instead of a Boolean
value (true|false)

enum Applicability
{
   NotEvaluated,
   NotApplicable,
   Optional,
   Recommended,
   Mandatory
}
```
510

```
// OR evaluations seek the MOST applicable result, so default to the LEAST
applicable value
applicability = Applicable.NotApplicable;
foreach (condition in orOperations)
{
   result = Evaluate(condition)
   if (result > applicability)
   {
      applicability = result
   }
}
```
520

```
// AND evaluations seek the LEAST applicable result, so default to the MOST
applicable value applicability = Applicability.Mandatory;
foreach (condition in andOperations)
{
   result = Evaluate(condition)
   if (result < applicability)
   {
      applicability = result
   }
}
```
530

FIG. 5

AUTOMATED MACHINE DEPLOYMENT AND CONFIGURATION

BACKGROUND

A personal computer is subject to the choices and tastes of an individual. An individual often chooses the brand, model, operating system, software, and services for her own personal computer. A personal computer can be configured with software that can have a diverse range functionality, e.g., building game worlds to financial analysis to worldwide communications. Personal computers are supported by an international marketplace of software tools and options, provided by various software vendors.

Configuration of a personal computer with an operating system and such software is subject to errors, incompatibilities, and malicious threats. While balancing those options and threats can be challenging for an individual, doing so is critical for any organization. Thus, organizations develop standards and policies regarding personal computers and work to enforce them. Organizations typically have in house or outsourced IT functions charged with helping users, setting up computers and maintaining compliance.

Organizations, e.g., companies, universities, non-profits, government organizations, etc. utilize a large number of computing devices such as personal computers, servers, special-purpose devices, etc. The configuration of such computers is typically subject to organizational information technology (IT) policy to ensure that the computers are configured with reliable and authentic software, to reduce crashes, to provide appropriate software configuration for each user, etc.

Configuring a large number of computers manually is a cumbersome and time consuming task that also costs substantial money and requires IT administration skill. While software deployment tools are available, such tools offer limited capabilities for automation. Further, many configuration tools require specific skills to use and have significant overhead to specify configurations. In complex organizations, where computing devices may be administered by an internal IT team as well as external IT service providers, such tools are hard to utilize.

The IT team is tasked with utilizing the available budget to manage the organization IT infrastructure, including to perform tasks such as scheduling periodic heath checks and updates of personal computers, targeting specific computers for updates according to their respective purpose of use, updating computers appropriately to comply with the IT policy, and providing dashboards and reports that inventory the computers and updates. A variety of software is available that supports one or more of these tasks. However, such software requires users, e.g., IT administrators, to learn proprietary scripting, custom database queries, which imposes a burden on the IT team. Further, such software often lead to lock in that requires use of proprietary technologies to deploy software and manage computers.

SUMMARY

Implementations described herein relate to methods, systems, and computer-readable media for automated computer configuration.

In some implementations, a computer-implemented method comprises providing a configuration tool on a computer. The method further comprises accessing, by the configuration tool, a configuration file that includes configuration settings, wherein the configuration file is a plain text file. The method further comprises selecting, by the configuration tool, particular settings for the computer from the configuration settings based at least in part on the configuration file and identification information of the computer. The method further comprises automatically configuring, by the configuration tool, the computer with particular software that is identified based on the particular settings.

In some implementations, accessing the configuration file may include receiving the configuration file from a deployment management server. In some implementations, providing the configuration tool may include executing the configuration tool locally on the computer, wherein the configuration tool is provided as an application package and wherein initiation of execution of the configuration tool on the computer is performed using a remote software deployment tool.

In some implementations, selecting the particular settings may include performing regular expression matching based on the configuration file and the identification information of the computer.

In some implementations, selecting the particular settings may include analyzing the configuration file using natural language processing (NLP) techniques. In some implementations, the configuration file may include a plurality of conditional rules of applicability. In these implementations, analyzing the configuration file using NLP techniques may include evaluating each of the plurality of conditional rules based on the identification information of the computer and an enumeration of applicability for the particular software, and selecting the particular settings based on the evaluating.

In some implementations, the particular settings may relate to particular software and specify one or more of: a version of the particular software, a type of installation process for the particular software, or an installation option of the particular software. In some implementations, at least one conditional rule of the plurality of conditional rules may specify a value without a property name. In these implementations, the evaluating includes selecting a specific software package based on the value.

In some implementations, at least one conditional rule of the plurality of conditional rules may specify a property-value pair. In these implementations, the evaluating is based on analyzing the property-value pair to identify the property and the value, and is commutative.

In some implementations, the identification information of the computer may include one or more of: a manufacturer, a model, an operating system version, a workgroup, or version information of prior installed software.

In some implementations, the particular software may include an operating system and one or more software applications. In these implementations, automatically configuring the computer includes installing the operating system and the one or more software applications on the computer by performing installation tasks. In these implementations, the method may further include receiving an update to the configuration file while the operating system is being installed on the computer, and updating the installation tasks based on the update to the configuration file. In some implementations, the updating includes at least one of: adding an additional installation task, modifying at least one of the installation tasks, removing at least one of the installation tasks, or reordering the installation tasks.

In some implementations, the particular software includes an operating system and one or more software applications. In these implementations, automatically configuring the computer includes installing the operating system and the one or more software applications on the computer by performing one or more installation tasks. In these implementations, the method may further include receiving, via a user interface, user input to modify at least one of the one or more installation tasks, and in response to the user input, updating the installation tasks. In these implementations, the updating includes at least one of: adding an additional installation task, modifying at least one of the installation tasks, removing at least one of the installation tasks, or reordering the installation tasks.

In some implementations, automatically configuring the computer may include selecting one or more software packages from a package repository that correspond to the particular software that is identified based on the particular settings, retrieving the one or more software packages from the package repository, and installing the particular software on the computer using the one or more software packages. In some implementations, the method may further include, prior to installing the particular software on the computer, verifying whether each of the one or more software packages is authentic. In these implementations, the installing is performed only for the software packages that are authentic.

In some implementations, automatically configuring the computer may include removing the particular software from the computer or modifying the particular software on the computer based on the particular settings.

In some implementations, the method may further include detecting a configuration change on the computer, wherein the configuration change includes an update to software on the computer. The method may further include, in response to detecting the configuration change, detecting a compliance violation based on a mismatch between the software on the computer with the particular settings. The method may further include, in response to detecting the compliance violation, updating the computer to modify the software on the computer based on the particular settings.

Some implementations include a non-transitory computer-readable medium with instructions stored thereon that, when executed by a processor cause the processor to perform operations for any of the methods described herein.

Some implementations include a system that comprises a hardware processor and a memory coupled to the hardware processor with instructions stored thereon that, when executed by a processor cause the processor to perform operations for any of the methods described herein.

BRIEF DESCRIPTION OF THE DRAWINGS

FIG. 3 illustrates an example configuration file, according to one or more implementations.

FIG. 4A illustrates an example configuration file, according to one or more implementations.

FIG. 4B illustrates an example enumeration, according to one or more implementations.

FIG. 5 illustrates an example of pseudocode that can be utilized to perform natural language interpretation of a configuration file

DETAILED DESCRIPTION

Figure 1:
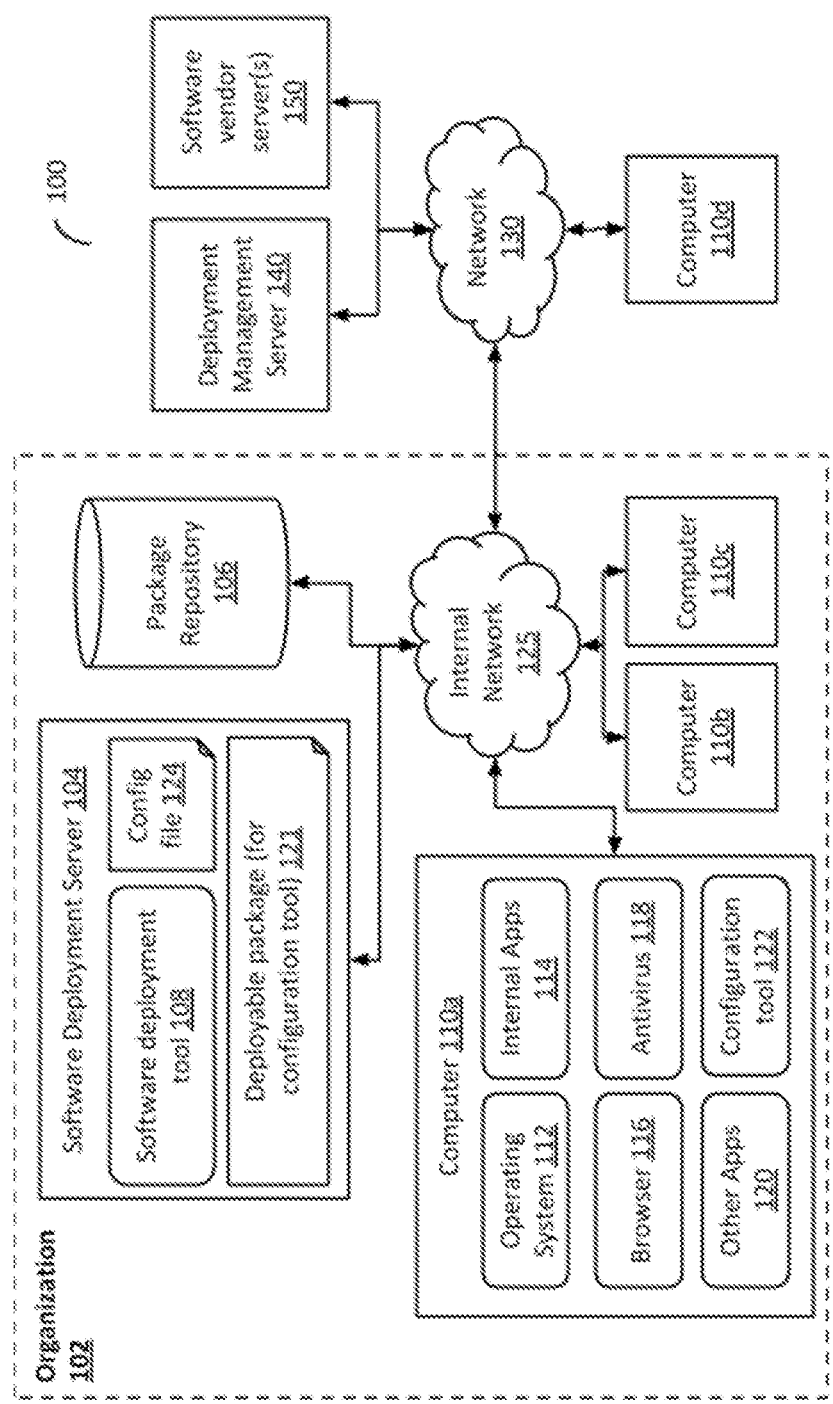
FIG. 1 is a block diagram of an example network environment which may be used for one or more implementations described herein.

Implementations described herein relate to automated computer configuration. The described implementations enable maintaining compliance to IT policy of computers across an organization. The implementations leverage available software deployment infrastructure and IT service management tools. The implementations enable provision of managed computer systems that are configured using software packages built from code (not images) and automated management of deployment configurations.

The implementations enable continuous automated compliance for any type of computers, such as personal computers, servers, or virtual machines. In some implementations, an interactive interface is provided to configure a computer and may enable a user (e.g., an IT department engineer, external vendor engineer, etc.) to select software configurations, view and accept/reject configuration recommendations, view a current stage of configuration of a particular computer, view configuration history, etc. The implementations described herein reduce administrator effort to ensure compliance of computing devices. The implementations are suitable for any type of computing device such as a personal computer, server, virtual machine, etc. The implementations enable configuration on bare metal devices (e.g., a device that does not have an operating system installed), building an operating system in an automated, responsive, and interactive manner.

The described implementations can reduce compliance cost and can enable continuous or periodic audits. Deviations can be fixed automatically by the described implementations. The implementations utilize a software package repository that can optionally be validated prior to installation.

The techniques described herein can be implemented as part of a configuration tool. In some implementations, the configuration tool can be provided as a single executable file. In some implementations, the executable file can be a portable executable, e.g., such that it can be executed on any computer, and even if the computer does not have an operating system installed. In some implementations, the configuration tool itself can be provided or deployed on a computer by a software deployment tool that can be utilized for deploying software on computers.

The described implementations enable a consistent configuration interface and simplify configuration of computers. The described implementations automate computer configuration and can reduce the burden on IT administrators, e.g., by eliminating the requirement that the administrator learn to use a particular deployment tool. Further, the described implementations simplify the process of specifying configurations for any type of computer by enabling configurations to be specified in a plain text, human-readable configuration file. Further, the configuration file is easy to audit and/or modify.

Implementations described herein identify particular settings (e.g., operating system and software applications, along with corresponding versions, settings, options, etc.) and automatically generate and execute installation tasks to configure a computer based on the particular settings. In some implementations, the installation tasks can be modified at runtime, e.g., during the time a computer is being configured, by updating the configuration file, or via a user interface. In implementations where a configuration user interface is provided, the user interface can include a preview of the installation tasks. Further, the configuration tool can be run in interactive mode on a computer to preview the tasks, before any actual installation tasks are initiated.

The configuration tool, as described herein, is independent of software deployment management tools that may also be present and utilized in an organization. Further, In some implementations, a schedule can be defined to execute the configuration tool such that computers are inspected to verify compliance with a configuration file and automatically updated if the computer is non-compliant, e.g., by adding, removing, or reconfiguring software, to update the configuration to be compliant.

Thus, various implementations described herein may simplify specification of computer configurations by enabling use of a plain text specification, automate configuration based specified configuration by evaluating conditions specified in the plain text specification and performing installation tasks, and ensure ongoing compliance via periodic, scheduled evaluation of computer configurations. The described implementations therefore simplify IT administration and reduce user burden in specifying, auditing, or configuring computers to ensure compliance with information technology policy that is applicable.

Implementations described herein provide universal software packages that work with any commercial software deployment infrastructure. The implementations can help reduce and/or eliminate delays, cost, or errors that may result from organization internal efforts to build and deploy software packages. A plain text configuration file, as described with reference to some implementations, enables specifying organization IT policy in a human-readable form. Further, such a configuration file can be specified easily, e.g., by using pre-populated templates (e.g., that capture IT best practices) which save cost, time, and prevent errors in specification. The described implementations enable automatic computer configuration, with user-controlled scheduling and automatic compliance verification to ensure that computers that are subject to organization IT policy are consistently maintained in a compliant state. Thus, IT departments benefit from improved control over computers (e.g., personal computers that belong to employees of an organization, server computers, etc.), increased policy compliance, reduced incidents related to misconfigured or non-compliance computers, increased uptime, and reduced security and audit risks. The described implementations are also usable for bare metal builds (e.g., computers with no operating system installed) and for repurposing or safely decommissioning computers.

FIG. 1 illustrates a block diagram of an example network environment 100 which may be used in some implementations described herein. Environment 100 includes a variety of computing devices, repositories, servers.

In some implementations, environment 100 may include devices coupled to an internal network 125 (e.g., an intranet) of an organization 102, such that the devices can exchange data with each other and with other devices via the internal network 125. Devices that are coupled directly to network 125 may be termed as organization internal devices. Network 125 may be managed by the organization. In the example environment shown in FIG. 1, organization internal devices include a software deployment server 104, a package repository 106, and computers 110a, 110b, and 110c. Environment 100 also includes devices coupled to a network 130 (e.g., the Internet), including a deployment management server 140, software vendor server(s) 150, and a computer 110d.

Software deployment server 104 may implement a conventional software deployment tool 108, e.g., Microsoft System Center Configuration Manager (SCCM), Intune, or other tools that provide software deployment functionality. In some implementations, software deployment tool 108 may execute on server 104 and may provide functionality to remotely deploy software a computer 110. Software deployment tool 108 is a conventional software deployment tool.

Implementations described herein are described with reference to configuration tool 122 which may be used to implement one or more of the methods and may provide one or more automatic computer configuration functions described herein; configuration file 124 which may be a plain-text file that specifies computer configurations according to an IT policy of organization 102; a package repository 106 which may store software packages that can be utilized by configuration tool 122 to install software applications on a computer 110; and a deployment management server 140 that may provide updates to configuration tool 122, to configuration file 124, or updates to one or more software packages stored in package repository 106. Various aspects of configuration tool 122, configuration file 124, package repository 107, and deployment management server 140 are described further in the rest of this document.

In some implementations, devices shown within the boundary (dotted line) of organization 102 (also referred to as organization internal devices) refers to any computing devices that are controlled (at least partially) or owned by a same organization, e.g., a company or other entity. Such devices may include servers and other systems managed by an IT department of the organizations, personal computers used by individual users (e.g., employees, consultants, etc.), etc. In some implementations, other (external) devices may temporarily connect to internal network 125, e.g., when such a device is on-premise, or coupled to internal network 125 via network 130 using a virtual private network (VPN) connection, In some implementations, organization internal devices may include personal computers (e.g., for use by employees, consultants, etc. that work for the organization), server computers (e.g., that store and/or serve data related to the organization's business, that provide server-based applications, etc.), and other computing devices (e.g., printers, scanners, audio/video conference equipment, special-purpose computing devices, networking equipment, etc.). In some implementations, organization internal devices may also include virtual machines implemented on a physical server directly controlled by the organization, or implemented on a cloud-computing provider service. For example, an organization may utilize virtual machines as personal computers, servers, or for other purposes.

In the example environment illustrated in FIG. 1, computers 110a, 110b, and 110c are computing devices coupled to internal network 125, while another computer 110d is coupled to external network 130. Devices 110a-110d may be jointly referred to as devices 110. For simplicity, four devices are shown in FIG. 1, but any number of computing devices (e.g., 100 devices, 10,000 devices, or more devices) may be included in environment 100. Computers 110 may be personal computers (e.g., laptops, desktops, tablets, etc.), server computers, special-purpose computing devices, etc.

In some implementations, a computer 110 may be configured with an operating system and one or more software applications. For example, computer 110a is shown configured with an operating system 112, internal apps 114 (e.g., which may be applications specific for use within the organization), browser 116 (e.g., a web browser), antivirus software 118, other apps 120, and a configuration tool 122. The system configuration for each computer 110 may be selected and/or controlled by an information technology (IT) department of the organization.

For example, such configuration may be selected based on a role of the user or users associated with the computer 110.

For example, a computer that is to be used by a user from the accounting department may include financial software applications in other apps 120, while another computer that is used by a user from the marketing department may include media editing software applications in other apps 120. The specific system configuration of computers 110 may be part of the IT policy of the organization.

In some implementations, one or more of computers 110 may be under control of an information technology (IT) department of the organization. With user permission of individual computers 110, the IT department may have access privileges to configure any computer 110, including installation and configuration of operating systems, application software, security policies, etc. Further, different users that utilize the devices may be categorized in different ways, e.g., by work role, by department, etc. Access privileges to computers may be restricted based on the type of user. For example, some users may be provided restricted access such that they do not have privileges (or have limited privileges) to install software or otherwise configure their computers.

The organization that controls computers 110 may have an IT policy that defines the software configuration of devices. For example, in some implementations, such policy may specify particular hardware configurations (e.g., make and model) of computers that are supported and approved. In another example, such policy may specify particular software configurations (e.g., operating system version, security software, application software, etc.) for computers that are part of organization internal devices 102. Such policy may be updated periodically. It may be noted that such configuration may be a partial specification, e.g., a minimum specification for a particular computer that is at least partially configured based on the IT policy. For example, a user may bring their own device (BYOD) which may be configured for use based on such an IT policy.

In some implementations, a software deployment server 104 may be provided. Server 104 may be configured to manage software deployment on one or more other computers, e.g., computers 110. For such purposes, server 104 may include software deployment tool 108 and/or IT service management (ITSM) tools. In different implementations, server 104 may be implemented as a hardware server, as a virtual machine, etc.

In some implementations, server 104 may store a deployable package 121 for configuration tool 122. For example, deployable package 121 may be in a package format that is suitable for deployment by software deployment tool 108 to any of computers 110. Deployable package 121 may be generated and updated/modified by deployment management server 140, e.g., that is managed by an external service provider. For example, deployment management server 140 and software deployment server 104 may execute a synchronization process (e.g., periodically) to update deployable package 121 stored on software deployment server 104. Such synchronization can enable the external service provider to seamlessly update configuration tool 122 on any computer 110 of organization 102, by leveraging software deployment tool 108.

Configuration tool 122 may include executable code that, when configuration tool 122 is executed locally on a computer 110, performs to configure the computer 110 to ensure that it is in compliance with an IT policy of organization 102 as applicable to the computer 110. In some implementations, configuration tool 122 may be provided as a portable executable file that can be executed on any type of computer 110 that is to be configured. The portable executable file may be stored on software deployment server 104 and may be sent (e.g., via internal network 125) to any computer 110, e.g., by use of software deployment tool 108. Software deployment tool 108 may schedule sending of the portable executable file of configuration tool 108, and may control transfer of the portable executable file to a computer 110. Once transferred, the portable executable file of configuration tool 122 may execute locally on a computer 110.

In some implementations, server 104 may include a configuration file 124 that specifies configuration for one or more computers 110. For example, the configuration file may specify the IT policy of the organization. In some implementations, configuration file 124 may be a plain text file. In some implementations, configuration file 124 may include a set of rules that are read and interpreted by configuration tool 122 when configuration tool 122 executes on a computer 110.

In some implementations, configuration tool 122 may be provided on server 104 via a file synchronization process with deployment management server 140 over networks 125 and 130. For example, deployment management server 140 may provide updated versions of configuration tool 122 to server 104.

In some implementations, configuration tool 122 and/or configuration file 124 on server 104 may be synchronized with deployment management server 140 via a file synchronization process. For example, deployment management server 140 may provide updated versions of configuration tool 122 and/or configuration file 124 to server 104.

In some implementations, environment 100 may further include a package repository 106. Package repository 106 may be a database or file storage that stores software packages. In some implementations, a software package may be a universal container or interface for an automated task, such as installing, removing, reconfiguring, and/or updating software, e.g., on any of computers 110. For example, a software package may include individual executable code modules that can be configured and executed to install a software application (e.g., any of operating system 112, or applications 114-120) on a computer. In some implementations, a software package may be provided in package repository 106 for installation and/or upgrade of configuration tool 122. In some implementations, deployment management server 140 may maintain package repository 106.

In some implementations, software deployment may include configuration tool 122 executing on a computer 110 utilizing configuration file 124 to determine the configuration for a computer 110. Upon determination of the configuration, configuration tool 122 may access package repository 106 to retrieve corresponding code modules to perform automated installation of software application(s) indicated in the configuration on the computer 110.

In some implementations, one or more software packages in package repository 106 may be in a format that is specific to configuration tool 122. In these implementations, installation of software on a computer 110 may be performed by execution of configuration tool 122, and configuration tool 122 may be configured to validate the software packages.

Organization 102 may employ either or both of software deployment tool 108 and configuration tool 122 to deploy and manage software on computers 110, e.g., thus allowing co-management of computers 110 by internal IT staff as well as external service providers. For example, organization 102 may manage certain software programs (e.g., organization-specific software applications) or specific settings (e.g., desktop wallpaper, color scheme, etc.) on computers 110 via software deployment tool 108, while simultaneously enabling an external service provider, e.g., that provides configuration tool 122 and package repository 106 to manage software configuration on computers 110.

Organization 102 can thus utilize a single interface (e.g., provided by software deployment tool 108) to manage computers 110, since configuration tool 122 itself can be rolled out via deployment tool 108. In turn, configuration tool 122 can ensure that computers 110 are in compliance with IT policy of the organization, as explained further with reference to FIG. 2. While computers 110 are thus managed jointly, such configuration management is seamless to the computers 110. Further, configuration tool 122 does not interfere with software deployment tool 108 in any manner and enables separation of responsibility of organization IT (that employs software deployment tool 108) and an external service provider (that employs configuration tool 122) to manage software configuration on computers 110.

Once provided on any computer 110, e.g., via internal network 125, configuration tool 122 is an executable file that can execute on the computer 110. Software deployment tool 108 may include executable code and may execute on software deployment server 104 such that software deployment tool can remotely install software on other devices of organization 102, e.g., a computer 110. Software deployment tool 108 may also be referred to as remote software deployment tool, since it executes remote from the computer 110 on which it installs or configures software.

In some implementations, configuration tool 122 may be single executable file that is small in size (e.g., 1 megabyte, <5 megabytes, etc.). The small size of configuration tool 122 can enable frequent and easy updates of configuration tool 122 on any of computers 110, e.g., by an external service provider distributing an updated deployable package 121 via deployment management server 140, which is then deployed by software deployment tool 108, in a manner specified and controlled by organization internal IT.

Configuration tool 122 may automatically configure any of computers 110 (as described further with reference to FIGS. 2-6), e.g., add/remove/modify installed software on the computer. In various implementations, configuration tool 122 may be executable in a silent mode, e.g., without display of a user interface of configuration tool 122, and/or in interactive mode, e.g., with display of the user interface of configuration tool 122 (that may enable a user to view and/or modify the configuration). Configuration tool 122 may be configured such that software deployment tool 108 can be utilized to schedule (or otherwise control) execution of configuration tool 122 on any of computers 110, using existing features of software deployment tool 108.

In some implementations, configuration tool 122 and package repository 106 may enable automated configuration of a computer 110 without requiring the installation and execution of other software (e.g., an agent or service) on the computer 110, and/or on computers, e.g., software deployment server 108. In these implementations, configuration tool 122 may be lightweight since it does not require any service or agent to execute to support automatic computer configuration. Configuration tool 122 may thus function in a standalone fashion. This is in contrast to conventional software deployment solutions that require such agents/services to run in order to deploy software.

In some implementations, configuration tool 122 can execute locally on a computer 110, without requiring access to the Internet. For example, configuration tool 122 may be provided on a computer 110 via software deployment server 104, or may be provided by directly plugging in a storage device (e.g., a USB drive) into the computer 110. Configuration tool 122 is thus flexible, and can be used on any type of computer such as a home PC, a medical device that includes a computer, etc. even when such a computer lacks internet access. This is in contrast to conventional deployment tools that require the computer to be managed (any of computers 110) to connect to a hosted server or cloud-based server.

Further, in these implementations, configuration tool 122 does not utilize a database or complex storage device (e.g., since it utilizes configuration file 124), and is therefore lightweight and portable. The use of pattern-matching and natural language processing techniques to analyze configuration file 124 (which itself is human readable and easy to edit) and to determine applicable configuration for a computer can eliminate the requirement for complex rules (e.g., specified via advanced scripts or encoded in complex markup languages). Further, configuration file 124 (which specifies configurations) is easy to audit, which can help improve trust between organization IT departments (that utilize configuration tool 122) and external service providers, enabling the multiple parties to manage computers 110 without disrupting others.

The described techniques, implemented via a configuration tool 122, thus provide a single, consistent interface that enables an external service provider to manage configurations of computers at any customer organization. Further, such management of configuration is independent of software deployment tools that may be in use at customer organizations. The techniques simplify endpoint compliance automation by enabling any endpoint (e.g., any of computers 110) to be automatically configured.

Networks 125 and/or 130 can be any type of communication network, including one or more of the Internet, local area networks (LAN), wide area network (WAN), wireless networks, switch or hub connections, etc. In some implementations, networks 125 or 130 can include peer-to-peer communication between devices, e.g., using peer-to-peer wireless protocols (e.g., Bluetooth®, Wi-Fi Direct, etc.), etc.

Some implementations may include a deployment management server 140 coupled to network 130. Server 140 may be controlled by a third-party, e.g., an IT service provider, that is different from an internal IT department of the organization associated with devices 102. In some implementations, deployment management server 140 may be configured in communication with multiple servers 104, e.g., for different organizations. Server 140 may store respective configuration files (e.g., configuration file 124) for multiple organizations. The IT service provider may create, edit, and store configuration files for different customers. In some implementations, server 140 may provide configuration file 124 or updates to configuration file 124, e.g., periodically, or on demand by server 104.

Some implementations may also include software vendor server(s) 150. Server(s) 150 may store code modules for various software applications. Server(s) 150 may combine the code modules into software packages and provide the packages to server 104 and/or server 140 for deployment. In some implementations, software vendors may provide code modules and combining the code modules into packages may be performed by e.g., server 104 (internal generation of packages), or by server 140 (external generation of package).

In some implementations, the IT department of organization 102 or an external vendor may download installation files from vendor server(s) 150. The IT department and/or external vendor may also provide a script to automate the installation and configuration, or removal of such downloaded software. In some implementations, a software package (e.g., stored in package repository 106) may include the installation files and the script. In some implementations, an external vendor that provides software packages for multiple organizations may generate separate customer-specific modules, scripts, and configurations, from pieces that are common, e.g., installation files from vendor server(s) 150. The external vendor may use proprietary tools to combine the customer-specific and common pieces of installation files into virtual directories, e.g., that may be provided on management server 140 which may be synchronized with deployment server 104 (or package repository 106), In these implementations, the external vendor can update the packages in a single place for each customer organization (e.g., the respective virtual directory) which are then configured to automatically synchronize with the respective deployment server 104 for that organization.

Configuration tool 122 may include executable code for software deployment. In some implementations, configuration tool 122 executing on a computer 110 may access software packages from package repository 106 to configure the computer 110 in accordance with configuration file 124, e.g., by installing one or more software applications with particular settings (e.g., in interactive mode, silent mode, or other mode; of particular versions, with specific installation options; etc.) by retrieving corresponding software packages from package repository 106. Configuration of a computer 110 by configuration tool 122 may be performed using methods described with reference to FIG. 2.

While FIG. 1 shows separate blocks for software deployment server 104 and package repository 106, in different configurations, these blocks may be implemented on the same server, e.g., a physical server, a virtual machine, etc. Alternatively, multiple servers 104 may be provided and utilized for software deployment. For example, multiple servers may be provided for redundancy/failover purposes, or at different office locations of the organization, etc.

Further, a computer 110 may be any type of computing device that is administered by the IT department of an organization, e.g., a desktop or laptop computer, a server, a special-purpose computing device, or other type of computing device. A computer 110 may be at an office location of the organization, a home location of a user associated with the computer, or at any other location. Deployment server 104 can provide a configuration tool 122 that can execute locally on a computer 110 and configure the computer 110 irrespective of its physical location, e.g., by utilizing a network connection of the computer. In some implementations, at an initial configuration stage, a computer 110 may be physically coupled to an internal corporate network of the organization, or may be configured by deployment software on a physical device, such as a USB flash drive or other portable device. In some implementations, one or more of computers 110 may be a virtual machine.

Figure 2:
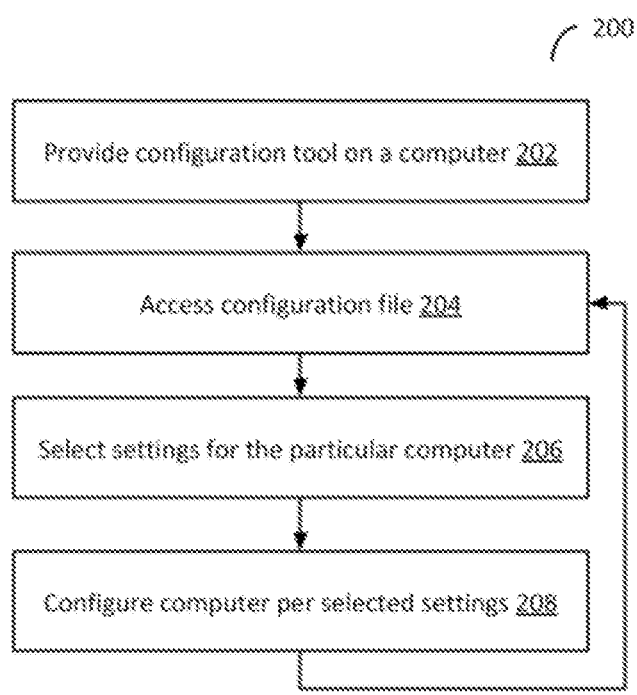
FIG. 2 is a flow diagram illustrating one example of a method for automated computer configuration, according to some implementations.

FIG. 2 is a flow diagram illustrating one example of a method 200 for automated computer configuration, according to some implementations. Method 200 may begin at block 202.

In block 202, a configuration tool (e.g., configuration tool 122) is provided on a computer, e.g., any of computers 110. For example, the configuration tool may be downloaded to a computer 110 from a software deployment server, or may be obtained from a physical device such as a USB drive or other storage device coupled to a computer 110.

In some implementations, the configuration tool 122 may run directly from such a physical device, e.g., a bootable USB drive plugged into a computer 110. In these implementations, the USB drive may include an installation package for an operating system. In some implementations, configuration tool 122 may execute on deployment server 104, e.g., that includes a network boot (PXE boot) service.

In some implementations, the software deployment server may, e.g., controlled by an IT department of the organization. In some implementations, the configuration tool may be a software package provided by an external party, e.g., an IT service provider.

In some implementations, the software package of the configuration tool may be suitable for installation by deployment server 104, e.g., may be provided as an application package that can be installed on a computer 110 by a software deployment tool 108 provided via deployment server 104. In these implementations, providing the configuration tool may include providing a package of the configuration tool on the server (e.g., deployment server 104) by a software deployment tool 108 that executes on a software deployment server (e.g., server 104). In some implementations, the configuration tool may be installed directly onto a computer 110 from a server controlled by a third-party IT service provider. In some implementations, the configuration tool may include executable code that performs automated software installation, configuration, verification, and/or other functions, to maintain software configuration on computers (e.g., any of computers 110). Block 202 may be followed by block 204.

In block 204, a configuration file (e.g., configuration file 124) is accessed, e.g., locally on the computer 110 that is being configured, from deployment management server 140, or from an external server coupled to network 130 e.g., managed by a third-party such as an IT service provider. In some implementations, a priority may be assigned to each of these sources and a sequential search for configuration file 124 may be performed. For example, the sequence may be a local search (e.g., in the directory in which the executable file for configuration tool 122 is stored, followed by other local directories, e.g., on computer 110 or a USB drive or other storage device plugged into computer 110. If no configuration file is found in the local search, a search for the file may be performed via internal network 125, e.g., to access configuration file 125 on server 104. In some implementations, e.g., if organization 102 has a plurality of deployment servers, local deployment servers (e.g., part of a local area network to which the computer being configured is connected) may be access first, and if no configuration file is found locally, remote deployment servers may be searched. If no configuration file is accessible via internal network 125, configuration file stored on a deployment management server 140 may be accessed.

In some implementations, the configuration file may be a plain text file, e.g., a file that contains human-readable text. In some implementations, the configuration file may specify settings specific for computers that are internal to the organization, e.g., one or more of computers 110. The configuration file may specify various parameters for software configuration, e.g., operating system (OS) type, OS version, security software, organization internal apps, other software, etc. The parameters may be specific to subsets of computers within the organization, e.g., based on an organizational role of a user or workgroup associated with the computer, based on a location of the computer, etc. Examples of configuration files are illustrated in FIGS. 3 and 4 below. Block 204 may be followed by block 206.

In block 206, particular settings are selected for the computer that is being configured. In some implementations, the particular settings may be selected based on the configuration file based on identification information of the particular computer. For example, identification information may include one or more of a manufacturer of the particular computer, a model of the particular computer, an operating system type and version of the particular computer, a workgroup of the particular computer, names and version information of prior installed software on the particular computer, etc. Identification information for the computer may include one or more of machine name, user name, software installed on the computer, settings associated with such installed software as stored by an operating system (e.g., as Windows registry entries when the computer is running the Windows operating system).

If the computer has no operating system configured, an operating system deployment process may be executed prior to selecting the particular settings. For example, a default operating system configuration (e.g., specified by the organization IT policy) may be provided as a package and installed automatically. In some implementations, the operating system may be installed in interactive mode, enabling an administrator to choose operating system version and/or system configuration to be installed on the computer.

For example, computers 110 may be from a variety of manufacturers and/or of different makes. Based on the manufacturer and/or model, the computers may have different hardware configurations, e.g., microprocessor (with different speed, number of cores, cache capacity, instruction sets, power utilization, etc.), graphics card (with different graphics processors, graphics memory, number of cores, etc.), memory (e.g., DRAM or other type of volatile memory), storage (e.g., solid-state storage, hard-drive storage, or other type of non-volatile memory), display (e.g., resolution, color gamut, etc.), media (e.g., sound output), I/O (e.g., keyboard, mouse, touch input, etc.), and other types of hardware. Some hardware configurations may be inadequate for certain types of software, e.g., computers without a dedicated graphics card may not be suitable for intensive graphics, or may have incompatibilities with certain software.

In another example, the operating system of the computer may have different levels of compatibility with certain software applications, based on the OS type and/or version. In another example, the workgroup of the particular computer (e.g., "Marketing," "Sales," "Accounting," etc.) may be indicative of a functional role of a user associated with the particular computer. In another example, the prior installed software on the particular computer may be indicative of a current state of configuration of the particular computer.

Identification information may further include a current software configuration of the computer, e.g., a current version of the operating system and related components (e.g., language packs, drivers, security patches, etc.), names and versions of other software installed on the computer (e.g., firewall, antimalware, or other security software; browser; office applications; entertainment applications; media editing applications; applications specific to organization 102; etc.).

In some implementations, selecting the particular settings may include performing regular expression matching based on the configuration file and the identification information of the particular computer. FIG. 3 illustrates an example configuration file, according to one or more implementations. The configuration file illustrated in FIG. 3 may be suitable for use by a configuration tool that performs regular expression matching.

As seen in FIG. 3, the configuration file includes a first section 310, a second section 320, and a third section 330. In each section, the left-side portion of each line indicates a software package name and the right-side portion indicates an evaluation criteria for applying that software package. For example, in section 310, the different lines correspond to packages for different versions of software such as Microsoft Driver Pack, Microsoft Hyper-V Integration Services, Nutanix VirtIO, Parallels Tools, and VMware tools that are to be installed based on the type of the computer.

For example, the first line in the first section 310 indicates that if the model of the computer is identified as "Surface Pro 6" the computer is to be configured with a driver pack for Surface Pro 6 (indicated by Surface Pro 6*). Regular expression matching may be used to identify lines in the configuration file that are applicable to the particular computer. For example, if the identification information includes "Surface Pro 6", the first line of the first section 310 is applicable to the computer while other lines of the first section 310 are not applicable. In some implementations, the character * may be utilized in the configuration file as a wildcard. For example, in the first line, the character * is utilized to indicate the driver pack version, with preference being given to the latest version available in the package repository (e.g., install version 6.4 rather than 6.3 or earlier versions). In some implementations, the character * may be utilized to indicate that a reboot of the computer is required after installation of the particular software identified.

The next two lines in the first section 310 may apply to other computers, e.g., other computers from the Surface series (from Microsoft) such as Surface Book, Surface Pro 3, Surface Pro 2, Surface Studio 2, etc. The fourth line indicates that if the particular computer is a Microsoft Virtual Machine (as indicated by the phrase "Microsoft_VM") and has particular versions of Windows installed on it (as indicated by the phrase "Win_8.0| Win_2012| Win_7 . . . "), the software package Microsoft Hyper-V Integration Services having a version 6.3.9600.16384 is to be installed on the particular computer. Note that the particular computer in this case is a virtual machine. Similarly, subsequent lines of the first section 310 may apply to virtual machines, as indicated by "Manufacturer=Nutanix" "Parallels_VM" and "VMware_VM" respectively.

When performing evaluation of the expressions in the configuration file illustrated in the example of FIG. 3, the character "&" may be interpreted as an "AND" operator (both conditions need to be true for the evaluation to return TRUE), the character "|" may be interpreted as an "OR" operator (either condition needs to be true for the evaluation to return TRUE), and the character "!" may be interpreted as a "NOT EQUAL TO" operator.

The configuration file illustrated in FIG. 3 includes a second section 320. The configuration specified in the second section 320 is a "standard build" applicable to computers within the organization, e.g., a default or standard configuration for any computer within the organization that meets the criteria specified in respective lines of the second section 320. For example, the software package "7-Zip 19.00" (where 19.00 specifies the version) is installed on all computers (based on the phrase "Always"), while the software packages "Adobe Acrobat Reader" "Microsoft Edge" and "Microsoft PowerToys (Preview)" are installed if the computer has a workstation operating system installed on it (as indicated by the phrase "Workstation_OS"). Various other installation/configuration parameters may be specified in the configuration file. For example, the second section 320 indicates that if Java 8 is installed on the computer ("Installed=Java 8.*:*") it should be removed, as indicated by the software package name "Oracle Java 8 (Remove)" and that the removal should be performed in any mode such as silent, unattended, or interactive mode.

The configuration file illustrated in FIG. 3 includes a third section 330. The configuration specified in the third section 330 is an "IT build" applicable to computers within the organization that belong to the Information Technology department of the organization. Different lines in the third section 330 of the configuration file specify various software packages and corresponding conditions for applicability of each software package.

While FIG. 3 illustrates three sections, a configuration file may include any number of sections (e.g., a single section, two sections, three sections, or more than three sections) and/or any number of lines to specify configuration. A single configuration file may thus be provided and is sufficient to specify evaluation criteria for all software (including operating system, internal applications, and external applications) that is to be used on various computers that are under control of an IT department of an organization, e.g., organization internal devices 102. Further, by allowing specification of criteria for each package using regular expressions (with the use of the characters &, |, !, *, etc. to specify evaluation logic), the configuration file enables configurations to be modified easily, without having to specifically write programs or complex rules for configuration. When new software packages become available, corresponding lines can be added to the configuration file. Further, removal of certain software can be performed by providing a software package that is configured to remove particular software (e.g., Java 8, in the example of FIG. 3).

It will be appreciated that for organizations with a large number of machines, a large number of software packages, or a large variety of configurations, the configuration file may be very large, e.g., may have thousands of lines. Updating such configuration files may be difficult in some contexts. For example, when a large number of versions and/or configuration options are available for a particular software package, the specification in the configuration file may become very complex and difficult for a human (e.g., IT administrator at the organization or at an IT service provider) to understand.

Further, with a large number and variety of computers and software packages, it may happen that evaluation criteria specified in the configuration file may not be met for some software packages, resulting in inadvertent deviations from the specified configurations. Such deviations may be difficult to detect. Still further, modifying the configuration files for any reason, e.g., a discovered security vulnerability, a compatibility problem, a bug that causes crashes, performance problems, etc. in a particular software version or problems that occur due to interaction between certain software application, etc. may be difficult, since each software package for the software application and corresponding evaluation criteria may need to be modified to ensure that the problematic software application(s) are updated or removed as necessary for each computer.

In some implementations, configuration files may be provided that can be analyzed programmatically, e.g., using natural language processing (NLP) techniques, and that enable flexible configuration of computers without having to specify the configuration for each software package with corresponding evaluation criteria in the configuration file. FIG. 4A illustrates an example configuration file that can be analyzed programmatically. FIG. 4B illustrates an example enumeration, according to one or more implementations.

The configuration file illustrated in FIG. 4A includes classes 410 and a specification 415. For example, various classes 410 of computers may be defined in the configuration file. As seen in FIG. 4A, a class "Generic" may be provided that corresponds to a computer configuration with minimal applications and that does not have company-specific configuration. Such a class may be suitable, e.g., for temporary use, for use to configure virtual machines used to test software, etc. Another class "Standard" may be provided that is a default class for all computers within the organization and that may define organization-standard applications and configurations. Additional classes for specific departments (e.g., IT, Sales, Marketing, etc.) or use cases (e.g., lab, test, etc.) may be provided that specify corresponding configurations. Some classes may subsume one or more other classes, e.g., the "IT" class of FIG. 4A may include standard apps and configurations, modified by additional specification provided for the IT class.

When a particular computer is to be configured, a configuration may be determined for the computer based on identification information for the computer and the computer may then be automatically configured with the corresponding software packages. Classes 410 allow easy creation of additional classes and also allows modification of existing classes (e.g., changes to software packages, additions or deletions of software packages). Such changes are easy to understand, since each class is a self-contained definition for a particular configuration. The use of classes can also enable access control on the configurations, e.g., modifications to the "Standard" class in the configuration file may require higher privilege levels (e.g., Organization IT head), while modifications to the "Marketing" class may require lower privilege levels (e.g., head of IT for Marketing department).

In FIG. 4A, a specification 415 is provided for the installation of the software application iTunes. In specification 415, it is specified that the verbosity for the installation can be either of "interactive" or "unattended." Additionally, it is specified that the installation of iTunes is optional, unless the particular computer belongs to the "Marketing" department. Note that, unlike the configuration file of FIG. 3, where each option is specified with a name (e.g., Model=Surface Pro 6) and each software package, including software version, is identified by a specific name (e.g., 7-zip 19.00, where "7-zip" which is the name of the software and "19.00" which is the version), specification 415 is a simple, natural language sentence.

For example, only the application name iTunes is specified, and the department name Marketing is specified without the specific pair "Department=Marketing." Further, while two allowable values of verbosity ("interactive" or "unattended") are specified, the value "silent" (which is a higher value in enumeration 420) is not mentioned. Thus, if configuration tool 122 is executed in silent mode, the software iTunes is not installed.

In some implementations, configuration tool 122 may use enumerations of one or more parameters. In some implementations, enumerations may be ordered lists that specify the order of priority for the parameter. In FIG. 4B, an enumeration 420 is shown for the parameter "Verbosity." Verbosity may refer to whether a software application is to be installed in interactive mode (with installation user interface displayed and various options enabled for selection by the user), in unattended mode (with installation UI displayed, but options disabled), or in silent mode (no UI displayed). Enumerations can enable flexible interpretation of specifications provided in the configuration file, as illustrated below. Similarly, enumerations for other parameters may be provided. Enumerations may be specified for various parameters, and may in general be human-readable.

In some implementations, configuration tool 122 may include the enumerations, e.g., as part of the code of configuration tool 122. In some implementations, configuration tool 122 may access enumerations from deployment management server 140. Further, when deployment management server 140 is utilized to manage software configurations in multiple different organizations, enumerations may be provided that are specific to each organization, e.g., by providing separate configuration tools for each organization, each with its corresponding enumerations. Still further, enumerations can be updated without changing configuration file 124.

In some implementations, configuration tool 122 is programmed to automatically install the latest version of a particular software package, when there are multiple matches. For example, if software packages "iTunes 10.2" and "iTunes 9.0" are available in the package repository, the software package "iTunes 10.2" is automatically selected based on the specification 415. Selection of earlier versions is enabled by using a specification that lists "itunes 9* is . . . ." such that the version information is recited in the specification. In this case, the more specific wording "itunes 9*" is indicative of a preference to install any iTunes version 9. Thus, by providing simple sentences such as specification 415, any configuration of software may be specified in a human-readable manner, while retaining the flexibility to specify at as granular a level as necessary (e.g., the generic "itunes"; a specific version "itunes 9.0"; any version that meets a criteria "itunes 9*"; etc.)

Similarly, a default value of "Recommended" may be specified as a value for packages that are applicable to a particular computer (based on the identification information) and the default value may be overcome by adding "Optional" to make the package optional for a particular configuration. Still further, certain types of computers, e.g., servers, may be specified such that no software package is applied to particular computers that match that type.

A specification in the configuration file can be written as natural language, e.g., plain English sentences, as seen in the example specification 415 ("itunes is interactive OR unattended AND optional except for Marketing"). The operations "AND" "OR" etc. may be replaced by other equivalents, such as "&" and "|" respectively, and additional operations such as "<=" ">=" "=" "NOT" etc. can also be provided that allow specifying logical conditions. For example, verbosity for a particular software application that needs to be installed in interactive mode can be specified as ">=interactive" while software that can be installed in either unattended or interactive mode can be specified as ">=unattended" and software that can be installed in a mode lower than interactive can be specified as "<interactive". As can be seen, the configuration file makes use of values specified in enumeration 420 to specify how particular software is to be installed.

The use of natural language techniques to interpret the configuration file results in the specification 415 being interpreted as "Install iTunes latest package" in "interactive" or "unattended" mode and that the installation is optional for all computers, other than computers that are identified as belonging to the "Marketing" department. It can be seen that Specification 415 is easy to understand for a human reader, easy to modify, and simpler than the evaluation conditions of FIG. 3.

Further, the particular mode can be automatically selected as either of "interactive" or "unattended." For example, unattended mode may be selected automatically for headless computers (e.g., virtual machines, kiosk machines, etc.) or machines where the configuration tool is executing in unattended mode, etc.) while the interactive mode may be selected automatically when the configuration tool is executing in interactive mode, and the computer has a display or other mechanism of interactivity with an administrator user. Configuration tool 122 may utilize enumeration 420 to choose the particular mode of installation, e.g., based on the priority specified in enumeration 420.

Another example of a specification that can be provided in the configuration file is "Dell Firmware Update U3818DW is interactive and mandatory". In this example, the configuration tool can interpret the specification to automatically choose the closest value to the specification, as long as the chosen value is within the allowable range provided in the specification. For example, the configuration tool may configure other software in silent or unattended mode, but may only apply the firmware update U3818DW if the configuration tool is executing in interactive mode.

Some implementations may enable further readability improvements of the configuration file by enabling property-value pairs to be transposed, while retaining the ability to interpret such pairs in statements in the configuration file. For example, instead of specifying "Software B is for Accounting when installed=Software A" in the configuration file, a specification of the form "Software B is for Accounting when Software A is installed" can be included in the configuration file.

In this example, transposition of property=value pairs can be performed by the configuration tool 122. For example, when analyzing the configuration file, each specified operation in a statement, no assumption may be made that the first part in the statement is always a property name. Instead, the method can include checking the entire statement to determine if a predefined property name (e.g. "is installed software A") is specified. Upon detecting the predefined property name on one side of the statement, the other portion of the statement is then taken as the value (e.g., "Software B"). In this manner, evaluating of the property-value pair is commutative such that properties and values can be specified in any order, e.g., in any sentence in the language. Further, semantic equivalents can be used for properties and/or values.

For example, all 3 statements below are valid and can be interpreted by configuration tool 122 as equivalent statements where the phrases "When Software A is installed" "if software A is present" and "If found software A" are semantically equivalent and specify the property (or condition) under which the value is "Software B" with the corresponding action is "installing" or "adding" software B to computers that have the property. Various actions such as install, add, uninstall, remove, update, upgrade, etc. can be specified in such statements.

- Statement 1: "When Software A is installed, Install software B" (property="When Software A is installed"; value="Software B", operator="is installed").
- Statement 2: "Install Software B if software A is present" (property="Software A is present"; value="Software B").
- Statement 3: "If found software A, add Software B" (property="If found Software A"; value="Software B").

FIG. 5 illustrates an example of pseudocode that can be utilized to perform natural language interpretation of a configuration file that is specified in this manner. The pseudocode is effective to determine the level of applicability of a particular parameter specified in the configuration file.

The pseudocode of FIG. 5 includes an enumeration 510 that indicates the hierarchical structure of the parameter "Applicability" that indicates if a software package is applicable to a particular computer. Enumeration 510 includes five values—"NotEvaluated", "NotApplicable", "Optional", "Recommended", and "Mandatory".

The pseudocode of FIG. 5 includes code snippet 520 for evaluation of OR conditions for applicability. For example, if two conditions of applicability are specified in a statement in the configuration file with an OR condition (e.g., "NotApplicable" OR "Optional") in the configuration file, code snippet 520 is utilized to determine the applicability of the software package. As can be seen, the code snippet first sets the value for the parameter at a lowest value ("NotApplicable") and iterates through the condition in ascending order (starting from "NotApplicable") and identifies the highest result in the enumeration that is specified in the statement, e.g., the value "Optional" in this example. Thus, the evaluation of an OR condition in the natural language statement results in selection of the most applicable result.

The pseudocode of FIG. 5 includes code snippet 530 for evaluation of AND conditions for applicability. For example, if two conditions of applicability are specified in a statement in the configuration file with an AND condition (e.g., "NotApplicable" OR "Optional") in the configuration file, code snippet 530 is utilized to determine the applicability of the software package. As can be seen, the code snippet first sets the value for the parameter at a highest value ("Mandatory") and iterates through the condition in descending order (starting from "NotApplicable") and identifies the lowest result in the enumeration that is specified in the statement, e.g., the value "NotApplicable" in this example. Thus, the evaluation of an AND condition in the natural language statement results in selection of the least applicable result.

Thus, computer configuration can be achieved without an administrator or other IT department user manually writing conditional scripts, queries, or rulesets that are binary in nature, resolving to TRUE or FALSE answers for each setting. This type of manual writing is cumbersome, since conditional statements can be lengthy, hard to write correctly, and difficult to comprehend. The use of NLP techniques that flexibly interpret statements as described herein can enable simpler configuration files that are easier to write and are easier to comprehend.

The configuration file includes an enumeration of applicability for particular software packages (e.g., enumeration 510 of FIG. 5) and includes conditional rules of applicability (e.g., specification 415 of FIG. 4A). The configuration file can optionally include enumerations of one or more other parameters (e.g., enumeration 420 of FIG. 4A that relates to verbosity) and corresponding conditional rules.

In some implementations, analyzing the configuration file using NLP techniques includes evaluating each of the conditional rules based on the identification information of the particular computer to determine applicability of the particular software, and selecting the particular software based on the evaluation. In some implementations, selecting the particular software may include selecting one or more of a version of the particular software, a type of installation process for the particular software, or an installation option of the particular software, based on the specification in the configuration file. Analyzing the configuration file may be performed using code that is similar to pseudocode modules 520 and 530 illustrated in FIG. 5. Once the configuration for the computer is determined, such configuration may be stored locally on the computer with an associated configuration name, e.g., when the computer runs Windows operating system, in the Windows registry, or in other suitable location. Block 206 may be followed by block 208.

In block 208, the particular computer is automatically (without manual input) configured with particular software that is identified based on the particular settings. For such automatic configuration, a task queue may be generated that includes a plurality of tasks, e.g., each task corresponding to portions of the particular software that is identified. For example, the task queue may include one or more tasks to install and configure an operating system (e.g., to install the OS, to install one or more patches or additional components such as language packs, drivers, etc.), and one or more tasks to install and configure application software. In some implementations, the plurality of tasks in the task queue may be ordered based on the configuration file. Such ordering may ensure that no conflicting tasks are included in the task queue.

In some implementations, automatically configuring the particular computer with the particular software may include installing an operating system on the particular computer by performing installation tasks in the task queue. For example, the installation tasks may include retrieving a package for the operating system from a package repository (e.g., package repository 106), performing build operations (e.g., one or more of code compilation with specific options, module selection, selection of particular installation options, etc.) to generate a build based on the particular settings, and installing the operating system and/or other software on the particular computer using the build. A build as referred to herein may include the installation and configuration of the operating system, drivers, or software applications for a particular computer, as specified in the configuration file.

In these implementations, the method may further include receiving an update to the configuration file while the operating system or other software is being installed on the particular computer. For example, the configuration file may indicate different settings from the particular settings, e.g., a different version number, an additional update for the OS, a security patch for the OS, removing certain OS components, etc. In these implementations, the method may further include updating the installation tasks based on the update to the configuration file. In different implementations, updating the installation tasks may include one or more of adding an additional installation task, modifying at least one of the installation tasks, or removing at least one of the installation tasks.

In some implementations, configuration tool 122 may provide a user interface (e.g., a Graphical User Interface, text user interface, or other UI) that allows a user (e.g., an administrator or IT staff) to control installation of the operating system or other software on the computer. The user interface may enable the user to view the particular software that is to be installed on the computer during the automatic configuration, to monitor progress of the configuration (e.g., status of installation of individual software), and/or to customize installation of the operating system or other software on the computer at the time of execution of configuration tool 122.

For example, upon execution of the configuration tool 122 on a particular computer, the particular software for the computer may be identified based on the particular settings for the computer. The user interface may be displayed indicating the software that has been identified and for which installation is being performed. The user may utilize the user interface to modify the installation, e.g., by adding or removing software, even as the configuration of the computer is underway. In this manner, configuration tool 122 may enable on-the-fly user modification of the software installation on the computer.

In these implementations, the user interface enables the user to override particular settings (identified based on the configuration settings in the configuration file) and customize software installation on the computer. Configuration tool 122 automatically adjusts configuration of the particular computer based on user input received via the user interface, even as installation tasks are being performed. Further, configuration tool 122 may adjust the installation tasks, e.g., add or remove tasks, modify the sequence in which the installation tasks are performed, prioritize one or more of the tasks over other tasks, etc. For example, such adjustment of installation tasks may be performed in response to modifications to configuration file 124.

For example, if the user input indicates that software A is not to be installed, but installation of software A has already been completed based on the particular settings, the installation tasks are automatically updated to include a task for the removal of software A. In another example, if the user input indicates that software B is to be installed that wasn't identified based on the particular settings, a task for the installation of software B is automatically added to the installation tasks.

Thus, rather than waiting for the configuration of the computer to be completed, and then modifying the configuration, e.g., by manually adding or removing software, the techniques described herein enable users to interactively modify the configuration and have the modifications automatically be applied to the computer, even during the configuration of the computer.

Determination of installation tasks may also include identifying if there are any dependencies, e.g., that a particular task A be completed prior to performance of task B. For example, such dependencies may exist if task B is for installation of software that requires that the software to be installed in task A be available on the computer. In one example, such tasks may be to install operating system updates, which may have a particular sequence in which the updates are applied. Configuration tool 122 may determine such dependencies from analysis of configuration file 122 to determine the particular settings for the computer, and may correspondingly generate a sequence of installation tasks (e.g., sequence in which individual packages from package repository 106 are utilized to install software) that accomplishes automatic configuration of the computer.

In some implementations, configuration file 124 may be provided such that individual items that have no dependencies are placed higher in the configuration file than other items that have dependencies. In these implementations, configuration tool 122 may utilize the order of items in configuration file 124 to determine the sequence of packages from package repository 106 to perform automatic configuration of the computer.

In some implementations, the method may include automatically updating the configuration of a computer when the configuration file changes, even when such changes occur while the computer is being configured. For example, a change in the configuration file may indicate that the computer is to be configured with an antimalware product B, whereas a prior version of the configuration file specifies a different antimalware product A. Per techniques described herein, such a change may be handled as follows. If no antimalware product has been installed, a configuration queue (that is formed based on analyzing the configuration file) is automatically modified to remove the antimalware product A from the queue and to add the antimalware product B to the queue. If antimalware product A is already installed (e.g., due to that portion of the configuration having been completed), a task to remove product A and to install product B is automatically added to the configuration queue. If antimalware product A is currently being installed when the configuration change occurs, the method may include allowing the installation task to complete, but adding removal of product A and installation of product B tasks to the queue, with an indication that the two tasks are to be performed upon completion of the installation of product A.

A configuration change may include a change to the software or firmware version, missing software (e.g., due to manual removal), unwanted software (e.g., due to manual installation by a user of the computer), or misconfigured software or firmware (e.g., due to manual modification, or due to automated update of the software configuration, e.g., after a software update or by a software deployment tool).

In another example, a configuration change may be received from an administrator that is using the configuration tool in interactive mode. For example, the administrator may use a user interface to remove one or more tasks from the queue (or to cancel an installation task that is currently being performed), and/or add additional software configuration tasks to the queue. Such modifications to the queue are automatically handled by the configuration tool.

In general, the configuration file may be monitored during the setup of a computer, and if changes are detected, the configuration queue of installation and configuration tasks is automatically modified, e.g., by performing block 206 to select the settings per the updated configuration file. Similar updates to the queue may be performed when configuration changes are provided interactively.

The described implementations therefore provide the ability to configure a bare metal computer (with no OS installed) or virtual machine (with no OS installed) with an operating system specifically built for the computer. Further, the described implementations enable an interactive and responsive OS build process, e.g., where an administrator (e.g., a third-party IT service provider) can add or remove settings to the configuration file and the build is updated based on the updated configuration file.

In some implementations, automatically configuring the particular computer may include selecting one or more software packages from a package repository (e.g., package repository 106), retrieving one or more software packages from the package repository, and installing the software on the particular computer. Alternatively, in some implementations, one or more software packages may be provided as part of the configuration tool.

For example, selecting the one or more software packages may be based on the particular settings for the computer. For example, the one or more software packages may be selected to include one or more of selecting a particular version (e.g., a regular or professional version of the software package, a 32-bit or 64-bit version, a particular version number), based on the particular settings. Package repository 106 may include multiple software packages for the same software application (e.g., iTunes 9.0 and iTunes 10.0) and a particular version may be selected based on the particular settings.

Retrieving the one or more software packages from the package repository may include copying each software package from the package repository to the particular computer over internal network 125. For example, an executable file of each software package may be copied to the particular computer for local execution.

Installing the particular software on the particular computer may include locally executing each downloaded software package, where the execution is controlled by configuration tool 122. In some implementations, installation-related parameters (e.g., install location in the filesystem of the particular computer, permissions granted to the software after installation, enabling/disabling automatic update of the software, enabling the software to run as a startup process, etc.) may be specified at the time of local execution of each software package. In some implementations, software packages in the package repository may be executable programs that are executable on the operating system of the particular computer.

In some implementations, prior to installing the software on the particular computer, it may be verified whether each of the one or more software packages is authentic, wherein the installing is performed only for the software packages that are authentic. For example, the software packages may be designed such that they can be utilized for software installation on the particular computer specifically by the configuration tool and may be unusable by other software deployment tools, e.g., software deployment tool 108. To verify a software package, the software package may be examined by the configuration tool to determine whether it is an authentic package. For example, the configuration tool itself may be signed by a vendor that provides the tool. Further, verification techniques such as hashes Or checksums may be provided for each package to enable verification of the package.

Installing software packages can include actions such as installing new software or modifying current software (e.g., adding or modifying customizations such as language packs, drivers, etc.). Validating that the software package is authentic and suitable for the computer can help ensure that no software is installed that can lead to a crash of the computer. For example, a crash may occur if an incorrect driver or operating system utility is installed on a computer, which is prevented by such validation. In another example, if verification is not performed, a maliciously modified package (e.g., that includes malware) may get installed on the computer. Validation can also help simplify copy protection since use of the configuration tool (that sets up a computer based on a configuration file and ensures ongoing compliance to the configuration file) makes separate audits of individual computers become unnecessary.

If the software package is verified as authentic, the software package is executed to install the corresponding software on the particular computer. In some implementations, a record may be maintained of each installation performed using the software package (each execution of the software package) such that an audit trail of use of the software package is maintained. In some implementations, the audit trail may be utilized to track executions of the software package.

After an initial time that blocks 202-208 are performed, a computer 110 may be configured in accordance with configuration specified in the configuration file 124. Block 208 may be followed by block 204 to obtain an updated configuration file such the computer is kept in compliance with the specification provided in the configuration file by performing blocks 204-208 any number of times.

Further, in some situations, a user or other entity may modify the configuration of the computer, e.g., by manually installing or updating particular software. Such changes may need to be audited, e.g., immediately upon detection of change, or periodically (e.g., once a day, once a month, etc.) based on the IT policy of the organization. Further, if a computer 110 is not compliant with the configuration file 124 (e.g., when the configuration file is updated), remedial action is automatically taken be performing blocks 206-208 to update the configuration of the computer. The techniques described herein enable automation of such audit and remedial action. In some implementations, method 200 may further include additional blocks to ensure that a computer 110 is compliant with organizational IT policies. In some implementations, the additional blocks for audit and compliance may be performed separately from method 200.

In some implementations, audit and compliance may include one or more of the following: (a) detecting a configuration change on the particular computer; (b) detecting a compliance violation based on a mismatch between the software on the particular computer with the particular settings; and/or (c) updating the particular computer to modify the software on the particular computer based on the particular settings. In some implementations, an audit-and-compliance program may be provided locally on the particular computer, or may be executed remotely, e.g., from a deployment server 104.

In some implementations, a configuration change may include an update to the software on a particular computer from a prior version. For example, a particular software may be listed as optional in configuration file 124, and during execution, configuration tool 122 may determine that an out of date (e.g., non-compliant) version of the particular software is present on the particular computer. In this example, in response to detection of the out of date version of the software, the particular settings may be updated to change the particular software as "Recommended." Configuration tool 122 may then access the corresponding package from package repository 106 to install a current (compliant) version of the particular software. In another example, if the IT policy of the organization (as specified in configuration file 124) indicates that out of date or non-compliant software, if found, is to be removed, configuration tool 122 may instead perform a removal task to remove any out of date or non-compliant software.

In another example, a configuration change can include addition of new software to the particular computer. In yet another example, a configuration change can include removal of software from the particular computer, e.g., software that is non-compliant with the settings, software that is misconfigured, etc. Such a configuration may be detected automatically. For example, such a change may be detected based on an operating system datastore, e.g., a registry that stores software configuration information, changes to particular folders (e.g., a program files or applications folder), etc.

In some implementations, a configuration change may include automatically removing software from a computer in response to a user associated with the computer leaving the organization (e.g., at which stage, organization-specific software or software licensed via the organization is removed), the computer being reallocated to a different user, the organization canceling license to particular software, etc. In some implementations, such configuration change may be trigged by identifying the computer for an "offboarding" configuration, wherein a corresponding configuration is specified in the configuration file. In some implementations, package repository 106 may include a package that includes executable code to remove or modify the particular software.

Changes to computer configuration that cause a computer to fall out of compliance and require remedial action may occur in various circumstances. For example, if a change to the physical location of the computer occurs (e.g., when a user carries the computer to a different country), such a change can trigger the installation of additional language packs, or reconfiguring VPN software to connect to a closer access point to the new location.

In another example, a change to detected hardware configuration of the computer (e.g., when the user connects an external device such as a webcam), can trigger the installation of appropriate software to support the new device.

In another example, a change in the configuration of the operating system (e.g., a change in the OS version installed on the computer) can trigger updates to the configuration of the computer. For example, if a computer is upgraded from Windows 7 to Windows 10, the installed software (compatible with Window 7) may be detected as out of compliance and may be automatically replaced with versions that are compatible with the new OS version (Windows 10).

In another example, a new version of a specific application becoming available may trigger a change in the configuration of the computer. For example, a 64-bit computer running a 32-bit version of a software program may be automatically updated to the 64-bit version of the software once it becomes available In response to detecting the configuration change, it may be determined if the change is a compliance violation. For example, a compliance violation may be detected based on a mismatch between the software on the particular computer and the particular settings applicable to the computer that are determined based on the configuration file.

If a compliance violation is detected, in some implementations, remedial action may be taken. In some implementations, the particular computer may be updated to modify the software on the particular settings. For example, extra software that is not specified in the particular settings may be removed, versions of software may be downgraded or upgraded to match the particular settings, or mandatory software that is absent from the particular software may be automatically installed.

In some implementations, automatic configuration of a computer may be performed using a configuration tool 122 that implements method 200. Upon execution of configuration tool 122 on a computer 110, the following actions may be performed.

1) Access package repository 106 to identify available packages.
2) Access configuration file 124 and determine settings for the computer 110.
3) For each package, determine if the package is applicable to the computer 110 by:
   a) Determining whether preconditions are met, e.g., the package is compatible with the computer 110, whether the configuration tool 122 is executing in a mode (e.g., interactive, silent, or unattended, that is suitable for use of the package, etc. If the preconditions are met, determine the settings for the computer 110 (based on configuration file 124) with reference to the package, e.g., whether the package is mandatory, recommended, optional, or not applicable for the computer 110.
   b) Determine whether the corresponding software is currently installed on the computer 110, and if installed, determine whether the package is to be applied to the computer. For example, the package is determined as not applicable if a version of the software that is currently installed is the same as or newer than the version in the package.
   c) Determine whether user input is received that requests installation of the corresponding software.
4) If the package is identified as applicable to the computer 110 (e.g., via settings in configuration file 124, or via user input), install the software on the computer 110.

Figure 6:
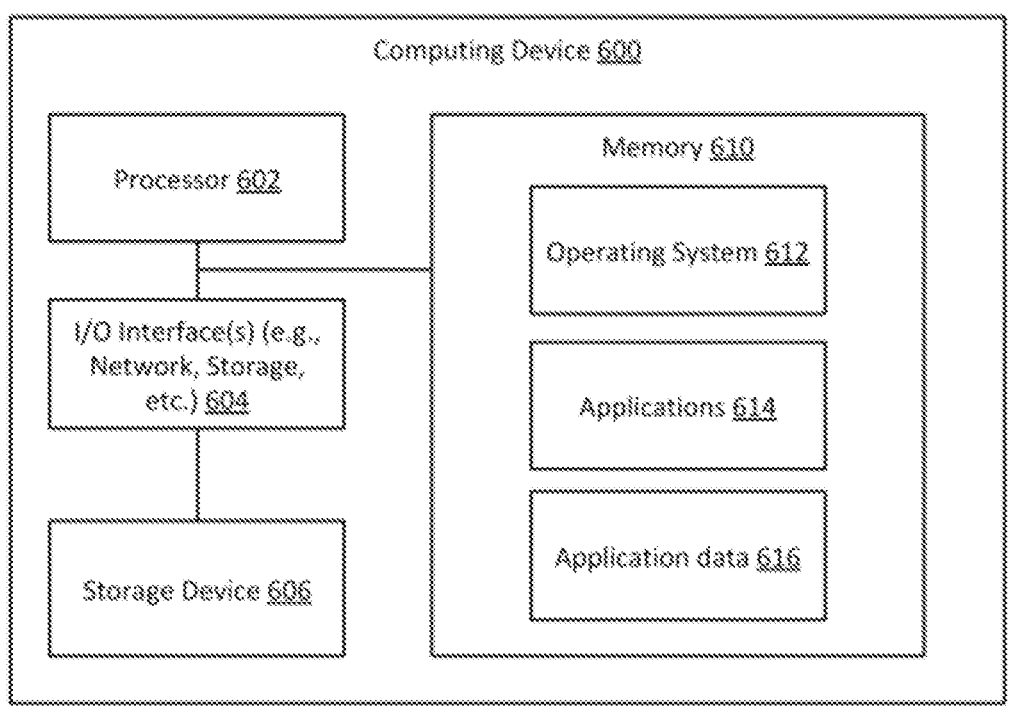
FIG. 6 is a block diagram of an example computing device which may be used to implement one or more features described herein.

FIG. 6 is a block diagram of an example computing device 600 which may be used to implement one or more features described herein. In one example, device 600 may be used to implement a computer device, e.g., any of deployment server 104, deployment management server 140, computers 110, etc., and perform appropriate method implementations described herein.

Device 600 can be any suitable computer system, server, or other electronic or hardware device. For example, the device 600 can be a mainframe computer, server computer, desktop computer, workstation, portable computer, etc. In some implementations, device 600 includes a processor 602, input/output (I/O) interface(s) 604, one or more storage devices 606, and a memory 610.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 610 is provided in device 600 for access by the processor 602 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 610 can store software operating on device 600 by the processor 602, including an operating system 512, one or more applications 614 (e.g., including configuration tool 122), and application data 616 (e.g., including configuration file 124). In some implementations, applications 614 can include instructions that enable processor 602 to perform the functions described herein, e.g., some or all of the method of FIG. 2.

Any of software in memory 610 can alternatively be stored on any other suitable storage location or computer-readable medium. In addition, memory 610 (and/or another connected storage device(s)) can store other instructions and data used in the features described herein. Memory 610 and any other type of storage (magnetic disk, optical disk, magnetic tape, or other tangible media) can be considered "storage" or "storage devices."

I/O interface 604 can provide functions to enable interfacing the computing device 600 with other systems and devices. For example, network communication devices, external storage devices, and other input/output devices can communicate via interface 604. In some implementations, the I/O interface 604 can connect to interface devices including input devices (keyboard, pointing device, touchscreen, microphone, camera, scanner, etc.) and/or output devices (display device, speaker devices, printer, motor, etc.).

Storage device 606 may be of any type, e.g., a solid-state storage device, a hard disk drive, etc. that can be used by operating system 612 and/or one or more applications 614. The storage device 606 is a direct-attached storage device, e.g., coupled to processor 602 and directly controlled by processor 602. Processor 602 is coupled to I/O interface(s) 604, storage device 606, and memory 610 via local connections (e.g., a PCI bus, or another type of local interface) and/or via networked connections.

For ease of illustration, FIG. 6 shows one block for each of processor 602, I/O interface 604, storage device 606, and memory 610 with software blocks 612, 614, and 616. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. Any suitable component or combination of components of system 102 or similar system, or any suitable processor or processors associated with such a system, may perform the operations described, e.g., with reference to FIG. 2.

A user device can also implement and/or be used with features described herein. Example user devices can be computer devices including some similar components as the computing device 600. An operating system, software, and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method for automated computer configuration for an organization, the method comprising:
   providing a configuration tool on a computer;
   accessing, by the configuration tool, a configuration file that includes configuration settings, wherein the configuration file is a plain text file, the plain text file specifying computer configurations according to an information technology (IT) policy of the organization in a human-readable form and written as natural language sentences;
   selecting, by the configuration tool, particular settings for the computer from the configuration settings based at least in part on the configuration file and identification information of the computer by performing regular expression matching based on the natural language sentences in the configuration file and the identification information of the computer; and
   automatically configuring, by the configuration tool, the computer with particular software that is identified based on the particular settings.

2. The computer-implemented method of claim 1, wherein accessing the configuration file comprises receiving the configuration file from a deployment management server.

3. The computer-implemented method of claim 1, wherein providing the configuration tool comprises executing the configuration tool locally on the computer, wherein the configuration tool is provided as an application package and wherein initiation of execution of the configuration tool on the computer is performed using a remote software deployment tool.

4. The computer-implemented method of claim 1, wherein the natural language sentences are plain English.

5. The computer-implemented method of claim 4, wherein selecting the particular settings comprises analyzing the configuration file using natural language processing (NLP) techniques to match the plain English, wherein the configuration file includes a plurality of conditional rules of applicability, and wherein analyzing the configuration file using NLP techniques comprises:
  evaluating each of the plurality of conditional rules based on the identification information of the computer and an enumeration of applicability for the particular software; and
  selecting the particular settings based on the evaluating.

6. The computer-implemented method of claim 5, wherein the particular settings relate to particular software and specify one or more of: a version of the particular software, a type of installation process for the particular software, or an installation option of the particular software.

7. The computer-implemented method of claim 5, wherein at least one conditional rule of the plurality of conditional rules specifies a value without a property name and wherein the evaluating comprises selecting a specific software package based on the value.

8. The computer-implemented method of claim 5, wherein at least one conditional rule of the plurality of conditional rules specifies a property-value pair, and wherein the evaluating is based on analyzing the property-value pair to identify the property and the value, and wherein the evaluating of the at least one conditional rule is commutative.

9. The computer-implemented method of claim 1, wherein the identification information of the computer comprises one or more of: a manufacturer, a model, an operating system version, a workgroup, or version information of prior installed software.

10. The computer-implemented method of claim 1, wherein the particular software includes an operating system and one or more software applications, and wherein automatically configuring the computer comprises installing the operating system and the one or more software applications on the computer by performing installation tasks, the method further comprising:
  receiving an update to the configuration file while the operating system is being installed on the computer; and
  updating the installation tasks based on the update to the configuration file, wherein the updating comprises at least one of: adding an additional installation task, modifying at least one of the installation tasks, removing at least one of the installation tasks, or reordering the installation tasks.

11. The computer-implemented method of claim 1, wherein the particular software includes an operating system and one or more software applications, and wherein automatically configuring the computer comprises installing the operating system and the one or more software applications on the computer by performing one or more installation tasks, the method further comprising:
  receiving, via a user interface, user input to modify at least one of the one or more installation tasks; and
  in response to the user input, updating the installation tasks, wherein the updating comprises at least one of: adding an additional installation task, modifying at least one of the installation tasks, removing at least one of the installation tasks, or reordering the installation tasks.

12. The computer-implemented method of claim 1, wherein automatically configuring the computer comprises:
  selecting one or more software packages from a package repository that correspond to the particular software that is identified based on the particular settings;
  retrieving the one or more software packages from the package repository; and
  installing the particular software on the computer using the one or more software packages.

13. The computer-implemented method of claim 12, further comprising, prior to installing the particular software on the computer, verifying whether each of the one or more software packages is authentic, wherein the installing is performed only for the software packages that are authentic.

14. The computer-implemented method of claim 1, wherein automatically configuring the computer comprises removing the particular software from the computer or modifying the particular software on the computer based on the particular settings.

15. The computer-implemented method of claim 1, further comprising:
  detecting a configuration change on the computer, wherein the configuration change includes an update to software on the computer; and
  in response to detecting the configuration change, detecting a compliance violation based on a mismatch between the software on the computer with the particular settings; and
  in response to detecting the compliance violation, updating the computer to modify the software on the computer based on the particular settings.

16. A non-transitory computer-readable medium with instructions stored thereon that, when executed by a processor cause the processor to perform operations comprising:
  providing a configuration tool on a computer;
  accessing, by the configuration tool, a configuration file that includes configuration settings, wherein the configuration file is a plain text file, the plain text file specifying computer configurations according to an information technology (IT) policy of an organization in a human-readable form and written as natural language sentences;
  selecting, by the configuration tool, particular settings for the computer from the configuration settings based at least in part on the configuration file and identification information of the computer by performing regular expression matching based on the natural language sentences in the configuration file and the identification information of the computer; and
  automatically configuring, by the configuration tool, the computer with particular software that is identified based on the particular settings.

17. The non-transitory computer-readable medium of claim 16, wherein providing the configuration tool comprises executing the configuration tool locally on the computer, wherein the configuration tool is provided as an application package and wherein initiation of execution of the configuration tool on the computer is performed using a remote software deployment tool.

18. A system comprising:
  a hardware processor; and
  a memory coupled to the hardware processor with instructions stored thereon that, when executed by a processor cause the processor to perform operations comprising:
  providing a configuration tool on a computer;
  accessing, by the configuration tool, a configuration file that includes configuration settings, wherein the configuration file is a plain text file, the plain text file specifying computer configurations according to an information technology (IT) policy of an organization in a human-readable form and written as natural language sentences;

selecting, by the configuration tool, particular settings for the computer from the configuration settings based at least in part on the configuration file and identification information of the computer by performing regular expression matching based on the natural language sentences in the configuration file and the identification information of the computer; and automatically configuring, by the configuration tool, the computer with particular software that is identified based on the particular settings.

19. The system of claim 18, wherein automatically configuring the computer comprises:

selecting one or more software packages from a package repository that correspond to the particular software that is identified based on the particular settings;

retrieving the one or more software packages from the package repository; and installing the particular software on the computer using the one or more software packages.

* * * * *